United States Patent
Bontu et al.

(10) Patent No.: US 6,445,745 B1
(45) Date of Patent: Sep. 3, 2002

(54) PHASE ENCODING METHODS FOR HANDLING MULTIPLE PHASE MODULATED SIGNALS ON A SINGLE CHANNEL

(75) Inventors: Chandra S. Bontu, Nepean (CA); Yonghai Gu, Redmond, WA (US); Shavantha Kularatna, Nepean (CA); Peter Barany, McKinney, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/306,434

(22) Filed: May 6, 1999

(51) Int. Cl.$^7$ ................................. H04L 27/18
(52) U.S. Cl. ............... 375/279; 375/244; 375/273; 375/279; 375/281; 375/283; 375/308; 375/322; 375/323; 375/330; 375/332; 370/215; 370/294; 370/345; 370/347; 370/350; 370/458; 370/498; 370/512; 370/514
(58) Field of Search ...................... 375/226, 223, 375/244, 273, 279, 280, 281, 283, 308, 322, 323, 329, 330, 331, 332; 370/215, 294, 345, 347, 350, 503, 442, 458, 483, 498, 512, 514, 510; 455/23, 42, 102, 139, 205, 67.6, 502

(56) References Cited

U.S. PATENT DOCUMENTS

| | | | | |
|---|---|---|---|---|
| 4,829,543 A | * | 5/1989 | Borth et al. | 329/306 |
| 5,408,504 A | * | 4/1995 | Ostman | 370/350 |
| 5,602,868 A | * | 2/1997 | Wilson | 329/300 |
| 5,673,291 A | * | 9/1997 | Dent | 329/304 |
| 5,828,560 A | * | 10/1998 | Malkamaki et al. | 370/203 |
| 5,987,068 A | * | 11/1999 | Cassia et al. | 329/316 |

* cited by examiner

*Primary Examiner*—Chi Pham
*Assistant Examiner*—Khanh Cong Tran

(57) ABSTRACT

A method for phase encoding DPSK and N-PSK which maintains phase continuity and which does not require any reference symbols when using N-PSK. A sequence of known DPSK phases are encoded with respect to an initial phase. The N-PSK phases are then all offset by this same initial phase. The known DPSK phases can be used at a receiver to determine a sum consisting of the initial phase and any further phase shift introduced by the channel, and this sum is used to decode the unknown N-PSK phases. The method is more generally applicable to any case where a switch between a phase encoding method which requires an absolute phase reference and a phase encoding method which does not have an absolute phase reference is to be implemented on a single carrier or channel.

19 Claims, 6 Drawing Sheets

DQPSK MODULATED SLOT

8-PSK MODULATED SLOT

G - GUARD TIME
R - RAMP
F - CONTROL BIT + RESERVED BITS
P - PILOT SYMBOL

PHASE ENCODING METHODS FOR HANDLING MULTIPLE PHASE MODULATED SIGNALS ON A SINGLE CHANNEL

FIELD OF THE INVENTION

The invention relates to phase encoding methods which enable the transmission of multiple PSK modulated signals and more particularly the transmission of differential and non-differential phase modulated signals on a single channel.

BACKGROUND OF THE INVENTION

In the ANSI 136 Rev. 0 standard which is an existing standard for TDMA (time division multiple access) communications, there is a DTC (Digital Traffic Channel) slot format specified which supports speech using only VSELP (vector-sum excited linear predictive) coding and IS-641 ACELP (algebraic code excited linear predictive) advanced 8-bit vocoders with π/4-shifted DQPSK (differential quadrature phase shift keying). The DTC slots are transmitted as part of a six slot frame which is up converted to a particular carrier. In slot formats such as these which are strictly differentially encoded, at a mobile receiver, channel parameters which are estimated during the reception of the SYNC (synchronization) sequence can be used to decode the rest of the slot because there is no phase discontinuity.

ANSI-136 Rev. A is a newer version of the standard which is backwards compatible with ANSI-136 Rev. 0 so as to support the above described π/4-shifted DQPSK encoded slot format. In addition, it also supports new DTC slot formats which feature US1 vocoder and 8-PSK modulation. This downlink DTC slot format begins with a SYNC sequence which is π/4-shifted DQPSK encoded followed by the remainder of the slot which is 8-PSK encoded.

During the SYNC sequence, the differentially encoded phases are shifted by an initial phase. During the remainder of the slot where 8-PSK is employed, absolute phase values are transmitted. In the presence of a non-zero initial phase, this results in a phase discontinuity at the boundary between the SYNC sequence and the remainder of the slot, and this phase discontinuity can result in various performance degradations. For example, the channel information estimated during reception of the differentially encoded SYNC sequence (in the presence of the initial phase) cannot be used to decode the remaining non-differentially encoded phases which do not include the initial phase.

In an existing proposal for handling this phase discontinuity, a reference symbol, REF, is inserted into the 8-PSK downlink slot structure immediately after the SYNC sequence to enable the determination of a carrier phase reference for the remaining 8-PSK symbols. While this reference symbol does solve the problem, it takes three bits (one phase) to implement, and is therefore a waste of precious bandwidth. Furthermore, in the presence of frequency selective fading, one reference symbol may not be enough to recover sufficient channel information to accurately decode the remaining data.

SUMMARY OF THE INVENTION

It is an object of the invention to obviate or mitigate one or more of the above identified disadvantages.

A preferred embodiment of the invention provides a phase encoding method for switching between DPSK (differential phase shift keying) and N-PSK (N-ary phase shift keying) which maintains phase continuity and which does not require any reference symbols when using N-PSK. A sequence of known DPSK phases is encoded with respect to an initial phase. The N-PSK phases are then all offset by this same initial phase.

An encoder, basestation and mobile station for implementing embodiments of the invention are provided. Advantageously, by eliminating the need for a reference symbol when using N-PSK, $\log_2 N$ additional bits are available for information or error correction coding.

The method is more generally applicable to any situation where a switch between a phase encoding method which requires an absolute phase reference and a phase encoding method which does not have an absolute phase reference is to be implemented. More generally, it can also be applied when there is a known sequence which is preceded by an unknown sequence, followed by an unknown sequence, or preceded and followed by unknown sequences.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
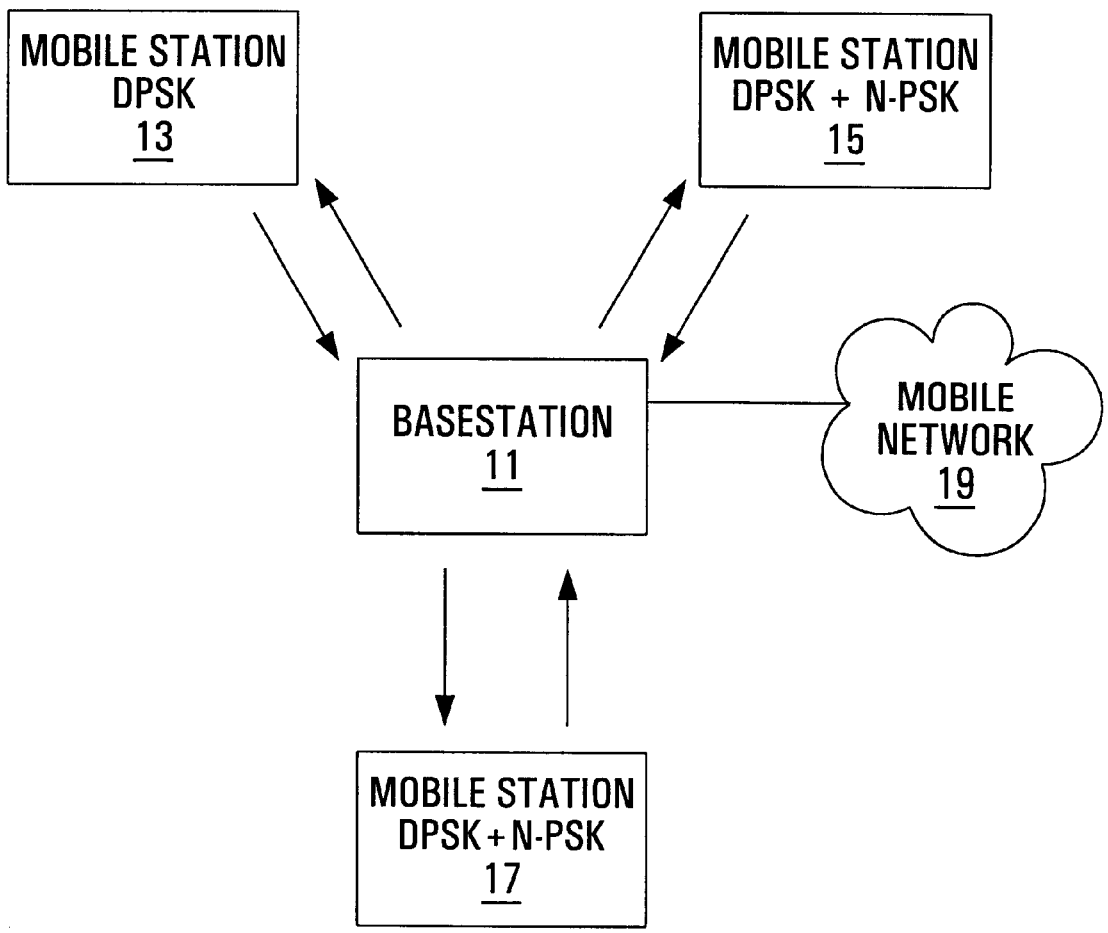
FIG. 1 is a block diagram of a mobile communications system.

Referring firstly to FIG. 1, a mobile communications system is depicted consisting of a basestation 11 and a plurality of mobile stations 13,15,17 (three shown). For the purpose of this example, it is assumed that mobile station 13 expects to communicate only using DPSK (differential phase shift keying) slots while mobile stations 15,17 are mobile stations which expect to communicate using a slot structure which is a mixture of DPSK and non-DPSK, preferably N-PSK. The channels from the basestation to the mobile stations are the downlink channels (forward link), and the channels from the mobile stations to the basestation are the uplink channels (reverse link). It is of course assumed that the basestation is connected to the rest of a mobile communications network generally indicated by 19.

Figure 2A:
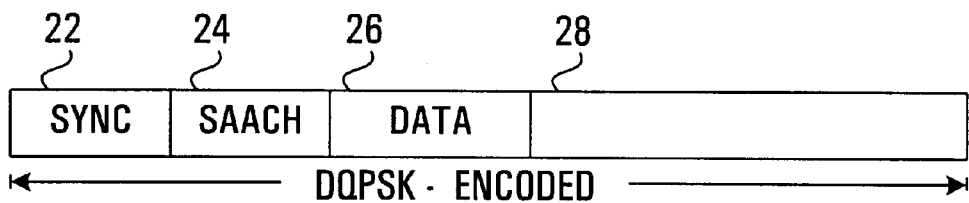
FIG. 2A is a summary view of the forward link slot format specified in ANSI 136 Rev. 0.

Mobile station 13 for example, might expect to receive slots such as illustrated in FIG. 2A, which is the slot structure in accordance with ANSI 136 Rev. 0 (and also with ANSI-136 Rev. A for π/4-shifted DQPSK). The slot has a format consisting of a SYNC sequence 22, a SAACH field 24, a DATA field 26, and various other fields collectively indicated by 28 the details of which are not shown since they are not important for the purpose of the invention. Each slot carries a total of 324 bits in the form of 162π/4-shifted DQPSK-mapped phases.

Figure 2B:
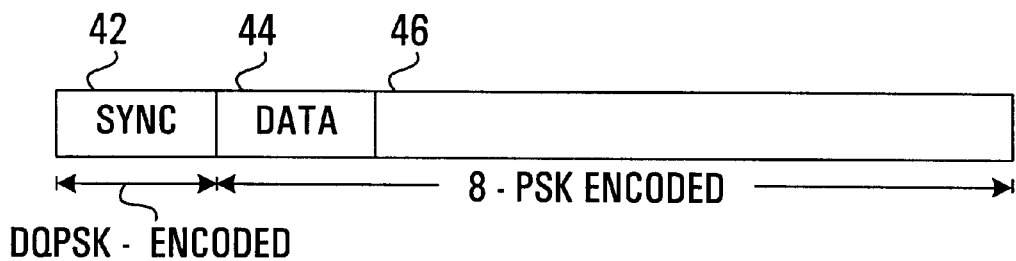
FIG. 2B is a summary view of a forward link slot format specified in ANSI 136 Rev. A.

Furthermore, mobile stations 15,17 might for example expect to receive downlink slots such as illustrated in FIG. 2B. This slot is in accordance with ANSI 136 Rev. A for 8-PSK encoding. The slot consists of a SYNC sequence 42, a DATA field 44, and various other fields collectively indicated by 46 the details of which are not shown since they are not important for the purpose of the invention. Each slot carries a total of 472 bits. The SYNC sequence consists of 28 bits in the form of 14π/4-shifted DQPSK-mapped phases, and the remaining fields consist of 444 bits in the form of 148 8-PSK-mapped phases, each phase representing three bits. Thus the phase encoding method changes at the end of the SYNC sequence 42.

Figure 2C:
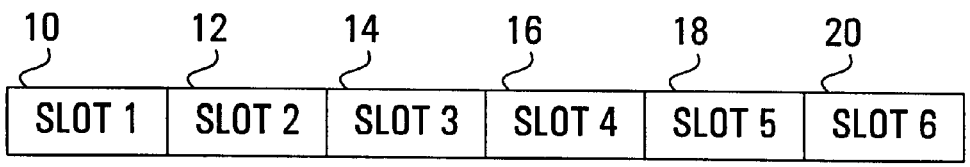
FIG. 2C is a summary of a forward link frame format specified in both ANSI 136 Rev. 0 and ANSI 136 Rev. A.

Referring to FIG. 2C, both ANSI 136 Rev. 0 and ANSI 136 Rev. A specify a downlink frame which is 40 ms in duration and consists of six slots 10,12,14,16,18,20 each 6.67 ms in duration.

At the basestation, when transmitting slots such as illustrated in FIG. 2B the first fourteen transmitted phases $\{\gamma_i, i=1,14\}$ correspond to the SYNC sequence and are given by:

$$\gamma_1, \gamma_2, \ldots, \gamma_{14} = \theta_c + \phi_1, \theta_c + \sum_{i=1}^{2}\phi_i, \ldots, \theta_c + \sum_{i=1}^{14}\phi_i$$

where $\phi_1, \phi_2, \ldots, \phi_{14}$ are the known differential phase shifts of the SYNC sequence, and $\theta_c$ is an initial phase which is selected at the beginning of the slot for the purpose of differential phase encoding. The remaining 148 phases correspond to the rest of the slot including the data and control phases. In existing proposals, the phases of the transmitted sequence consist of a known reference 8-PSK phase $\phi_{REF}$ followed by unknown 8-PSK phases as follows:

$$\gamma_{15}, \gamma_{16}, \ldots, \gamma_{162} = \phi_{REF}, \phi_{16}, \phi_{17}, \ldots, \phi_{162}$$

where $\phi_{16}, \phi_{17}, \ldots, \phi_{162}$ are the unknown phases in the present slot. In other words, the transmitted phases consist of a reference phase and the actual unknown phases.

Figure 3:
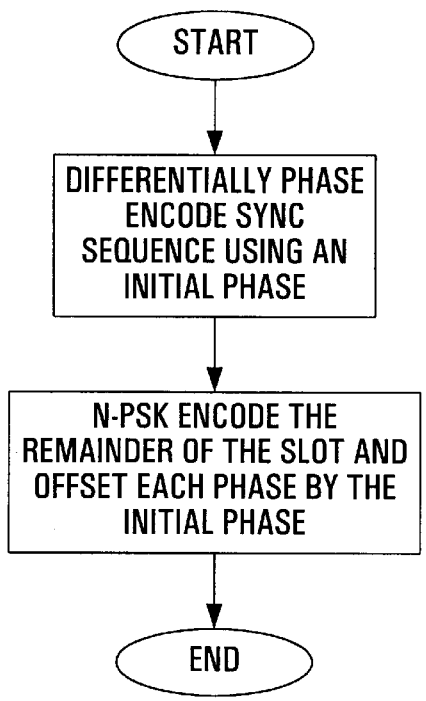
FIG. 3 is a flowchart for a phase encoding method implemented by an encoder according to an embodiment of the invention.

According to the invention, the phases of the transmitted sequence following the SYNC sequence are 8-PSK phases as follows:

$$\gamma_{15}, \gamma_{16}, \ldots, \gamma_{162} = \theta_c + \phi_{15}, \theta_c + \phi_{16}, \ldots, \theta_c + \phi_{162}$$

where $\phi_{15}, \phi_{16}, \ldots, \phi_{162}$ are the unknown phases in the present slot, and $\theta_c$ is the previously referenced initial phase used in generating the transmitted DQPSK phases for the SYNC sequence. In other words, rather than transmitting a set of phases consisting of 0, π/4, π/2, 3π/4, π, 5π/4, 3π/2, and 7π/4 for the 8-PSK transmitted sequence, an effective constellation consisting of the phases $\theta_c$, $(\pi/4+\theta_c)$, $(\pi/2+\theta_c)$, $(3\pi/4+\theta_c)$, $(\pi+\theta_c)$, $(5\pi/4+\theta_c)$, $(3\pi/2+\theta_c)$, and $(7\pi/4+\theta_c)$ is used for the duration of the 8-PSK transmitted sequence. A flowchart for the phase encoding performed at the encoder is shown in FIG. 3. By implementing this phase encoding scheme at the basestation, it is no longer necessary to insert a three bit reference symbol $\phi_{REF}$ in the 8-PSK downlink slot format for reasons which will be made clear below. This frees up an additional three bits which can then be used to achieve additional Forward Error Correction (FEC) gain for example.

By adding $\theta_c$ to the 8-PSK sequence, there is no phase discontinuity when the phase encoding scheme changes. This has an advantage that the channel characteristics determined during the reception of the SYNC sequence can be used during the reception of the 8-PSK sequence.

The particular decoding technique employed at the mobile receiver is dependent upon a particular application and channel model. For example, it may be that at the receiver, the 162 transmitted symbols are modelled as being corrupted by a frequency nonselective Raleigh fading channel (which is multiplicative) and therefore the phases of the received 162 symbols can be represented as follows:

$$\theta_c + \phi_1 + \psi_1, \theta_c + \sum_{i=1}^{2}\phi_i + \psi_2, \ldots, \theta_c + \sum_{i=1}^{14}\phi_i + \psi_{14},$$

$$\theta_c + \phi_{15} + \psi_{15}, \ldots, \theta_c + \phi_{162} + \psi_{162}$$

where $\psi_k$ is an unknown phase shift introduced by the channel at the kth symbol. The SYNC sequence is decoded using any conventional techniques such as differential decoding or correlator techniques for example. Various techniques for decoding the first data phase can be employed, and one example will be given here. From the above equation it is clear that to recover $\phi_{15}$, it is necessary to obtain an accurate estimate of $\theta_c + \psi_{15}$.

According to the invention as introduced above, 8-PSK data phases are offset by the initial $\theta_c$ at the transmitter. The total phase shift introduced by the channel after the receipt of k symbols will be referred to as $\beta_k$ and includes the carrier phase $\theta_c$ and the random phase $\psi_k$. $\beta_{14}$ is the total phase shift introduced by the channel at the end of the SYNC sequence and can be determined by the receiver using the known SYNC sequence information as follows:

$$\beta_{14} = \left\{\theta_c + \sum_{i=1}^{14}\phi_i + \psi_{14}\right\} - \sum_{i=1}^{14}\phi_i$$

Note that in the above, the expression in brackets is simply the 14th received phase, and the expression outside the brackets is the known expected 14th received phase in the absence of initial phase and channel effects. More complex techniques can be applied to more accurately estimate $\beta_{14}$ using more than one symbol for example. Subsequently, the first data symbol in the present DTC slot is decoded using this channel information as follows:

$$\phi_{15} = (\theta_c + \phi_{15} + \psi_{15}) - \beta_{14}$$

where $\phi_{15}$ is the estimate of the 15th phase (i.e. the first data phase) in the slot. In the above, the expression in brackets is simply the 15th received phase, and $\beta_{14}$ is computed as expressed previously. By substituting the expression for $\beta_{14}$ in this equation, we get:

$$\phi_{15} = (\theta_c + \phi_{15} + \psi_{15}) - (\theta_c + \psi_{14}) = \phi_{15} + (\psi_{15} - \psi_{14})$$

Since the channel phase does not change significantly between adjacent phases, $(\psi_{15} - \psi_{14})$ is very small compared to the data phase $\phi_{15}$.

Similarly, subsequent phases (for example the $i+1^{th}$ phase) can be decoded by first determining the total phase introduced up until the previous symbol which has been previously estimated as $\phi_i$ as follows:

$$\beta_i = \{\theta_c + \phi_i + \psi_i\} - \phi_i, i \geq 15$$

where the expression in brackets is simply the $i^{th}$ received phase. Next, an estimate of the present symbol $\phi_{i+1}$ can be made according to:

$$\phi_{i+1} \approx \{\theta_c + \phi_{i+1} + \psi_{i+1}\} - \beta_i$$

where the expression in brackets is simply the $i+1^{th}$ received phase.

Figure 4:
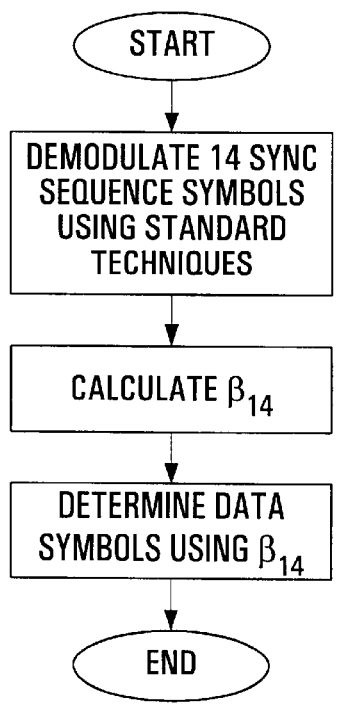
FIG. 4 is a flowchart depicting a simple phase decoding method as an example.

FIG. 4 is a flowchart for the decoding method of the specific example given above.

Figure 5:
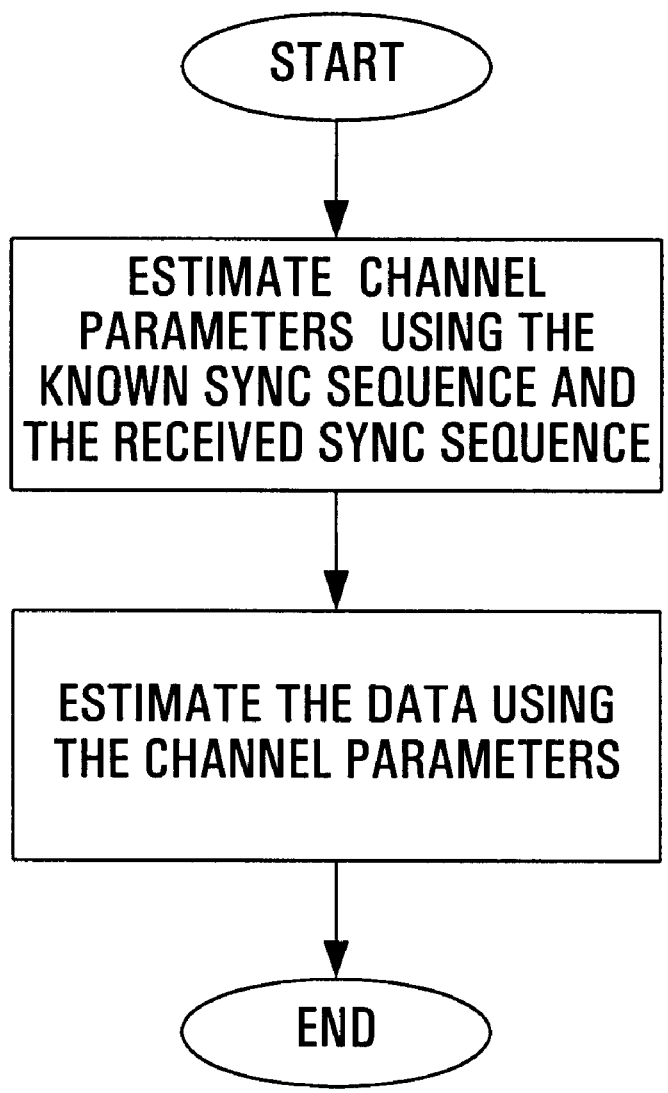
FIG. 5 is a flowchart for a more generic decoding approach according to an embodiment of the invention.

More generally, a flowchart for a decoding method for decoding slots having a known differentially phase encoded portion, and a non-differentially phase encoded data portion offset by the same initial phase used in the differentially encoded portion is shown in FIG. 5. The first step is to estimate one or more channel parameter(s) using the known differentially phase encoded portion. Next, since there is no phase discontinuity, these channel parameter(s) can be used to decode the phase encoded portion. Thus the second step simply consists of estimating the data phases using the estimated channel parameters. The specifics of these steps will of course depend upon the particular application and channel model.

The described embodiments have dealt with specific examples in which the ANSI 136 Rev. 0 and ANSI 136 Rev. A standards have been employed and more specifically the examples have dealt with switching between π/4-shifted DQPSK and 8-PSK. It is to be understood that the invention is not to be limited to this particular application.

Preferably, an embodiment of the invention is applicable whenever there is known content which is to be transmitted using a phase encoding/modulation scheme which requires no absolute phase reference, for example DPSK, CPFSK (continuous phase frequency shift keying) or MSK (minimum shift keying), followed and/or preceded by unknown content which is to be transmitted on the same channel or carrier using a phase encoding/modulation scheme which requires an absolute phase. More preferably, an embodiment of the invention is applicable whenever there is known content which is to be transmitted using some type of differential phase encoding followed by unknown content which is encoded with any non-differential phase encoding method, such as 4-PSK, 16-PSK for example. More preferably, an embodiment of the invention is applicable for the case where the unknown data requiring an absolute phase reference precedes the known data with no absolute phase reference.

Examples of this include:

known DPSK phases followed by unknown N-PSK phases (this is the specific example given above);

unknown N-PSK phases followed by known DPSK phases followed by unknown N-PSK phases (an example of this is given below for a mobile station—basestation link).

Still more preferably, an embodiment of the invention is applicable to maintain phase continuity for the case where the known content has an absolute phase reference, and unknown content which follows and/or precedes the known content does not have an absolute phase reference.

Several specific examples in which embodiments of the invention are applicable include:

known N-PSK phases followed by unknown DPSK phases in which case an initial phase used for the unknown DPSK is added to each of the known N-PSK phases;

unknown DPSK phases followed by known N-PSK phases followed by unknown DPSK phases in which case the same initial phase used for differentially phase encoding both the unknown DPSK sequences is further used to phase shift the known N-PSK phases; and unknown DPSK phases followed by known N-PSK phases in which case an initial phase used for the unknown DPSK phases is added to each of the known N-PSK phases.

In a preferred embodiment of the invention, the basestation is equipped to be able to communicate on a single carrier with both mobile stations which expect 8-PSK modulated slots, and mobile stations which expect DQPSK modulated slots.

By performing the phase encoding process described previously for 8-PSK modulated slots, both 8-PSK and DQPSK slot formats can be accommodated on a single carrier.

Figure 6:
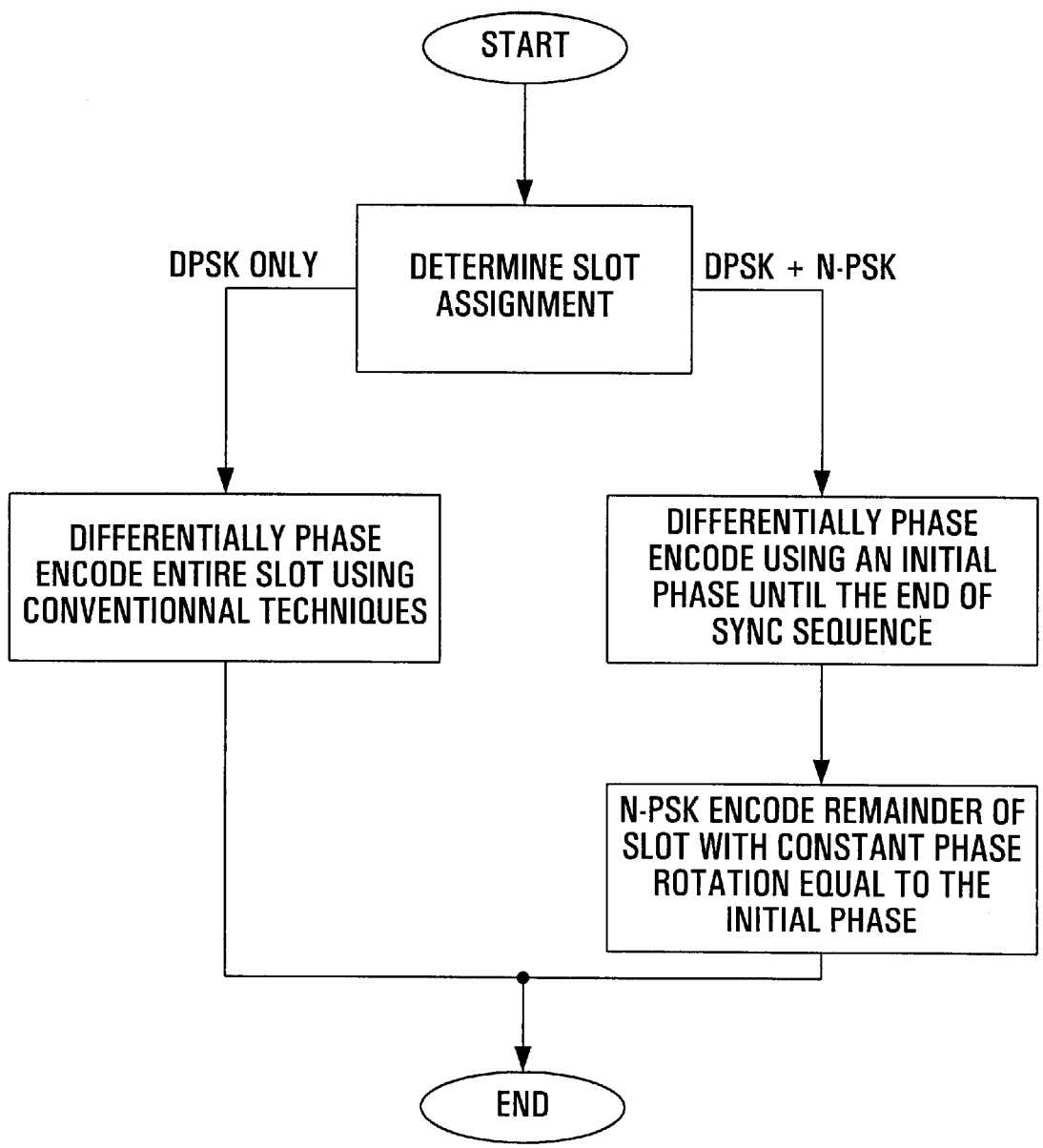
FIG. 6 is a flowchart for a phase encoding method implemented by an encoder in a transmitter which serves both receivers expecting DPSK only and receivers which expect both DPSK and N-PSK.

FIG. 6 is a flowchart of the phase encoding process performed at such a basestation. To begin, for each slot, a determination is made as to whether the current slot is to be entirely differential phase encoded (DPSK only) or the current slot requires both differential and non-differential phase encoding, such as N-PSK.

If the current slot is only DPSK, then the entire slot is encoded by differentially phase encoding the entire slot using some initial phase $\theta_c$. In general, $\theta_c$ is unknown, and is in the range of 0 to $2\pi$. It may for example be selected to be a left over phase calculated at some previous time.

If the slot requires DPSK and N-PSK then the slot is encoded as described previously respecting FIG. 3.

Figure 7A:
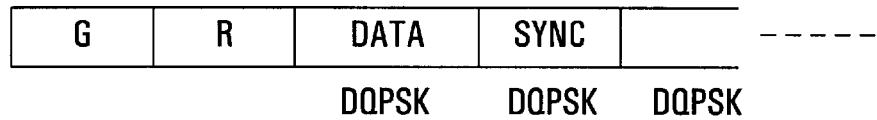
FIGS. 7A and 7B are the uplink slot formats for ANSI 136 Rev. 0 and ANSI Rev. A respectively.
Figure 7B:
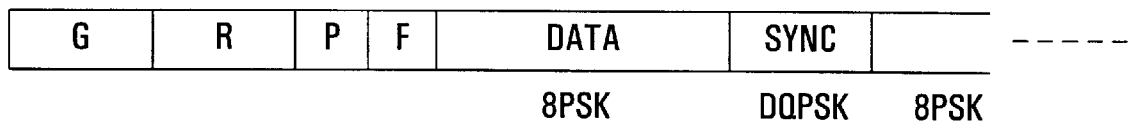

The above described embodiment deals with the forward link, i.e. the link from a basestation to a mobile station. More generally, an embodiment of the invention can be provided at any encoder. For example, a preferred embodiment of the invention provides the same technique applied to the reverse link, i.e. the link from a mobile station to a basestation. For example, a first uplink slot format which is DQPSK modulated and a second uplink slot format which is 8-PSK modulated are shown in FIGS. 7A and 7B respectively. In the first uplink slot format, all of the slot is DQPSK modulated. In contrast, in the second uplink slot format, there is a SYNC sequence which is DQPSK modulated whereas the rest of the slot is 8-PSK encoded. This includes 8-PSK encoded fields which both precede and follow the SYNC sequence. The invention can be applied to the second uplink slot format of FIG. 7B by using an initial phase $\theta_c$ when phase encoding the π/4-shifted DQPSK SYNC sequence, and then adding this same initial phase to the 8-PSK encoded phases both before and after the SYNC sequence. This example makes it clear that the known content does not necessarily need to be transmitted first.

As before, many different decoding techniques can be used at a receiver to decode such slots. For example, at the decoder, this time the basestation, the SYNC sequence might be decoded first. The 8-PSK field following the SYNC field can, for example, be decoded as described above for the downlink channel. The 8-PSK field which precedes the SYNC sequence can be decoded in reverse order starting at the last data symbol before the SYNC sequence.

As was the case for the down link embodiment, of course it is to be understood that an embodiment of the invention provides a phase encoding method which includes a switch between various phase encoding formats is not limited to those given in the specific example above.

It is to be understood that the various encoders and encoding methods described above and variants thereof are embodiments of the invention per se which in no way depend upon any decoder or decoding methods. Whereas encoding methods are often standardized, decoding is typically left to individual manufacturers and proprietary techniques are usually used.

Numerous modifications and variations of the present invention are possible in light of the above teachings. It is therefore to be understood that within the scope of the appended claims, the invention may be practised otherwise than as specifically described herein.

For the downlink embodiments, although any value for $\theta_c$ can be used, preferably, $\theta_c$ at the encoder is selected to equal the phase of the last symbol of the previous DTC slot, for example, the 162nd symbol of the previous slot if the format is ANSI-136. In the particular example that the previous slot is π/4-shifted DQPSK only, this means that $\theta_c$ would be defined as follows:

$$\theta_c = \theta_{c,prev} + \sum_{i=1}^{162} \phi_{i,prev}$$

For the particular example that the previous slot has π/4-shifted DQPSK phases followed by 8-PSK phases, this means that $\theta_c$ would be defined as follows:

$$\theta_c = \theta_{c,prev} + \phi_{162,prev}$$

where in both of the above equations, $\theta_{c,prev}$ is the previous slot's initial phase, and $\phi_{i,prev}$ are the phase shifts of the previous slot's symbols.

We claim:

1. A phase encoding method comprising:
   encoding a first sequence using a first phase encoding method to produce a first encoded sequence and encoding a second sequence which follows the first sequence using a second phase encoding method to produce a second encoded sequence wherein one of the first and second sequences is known and the other one of the first and second sequences is unknown;
   wherein one of the first and second phase encoding methods does not require an absolute phase reference for each encoded phase, and the other one of the first and second phase encoding methods requires an absolute phase reference for each encoded phase which is selected such that there is no phase discontinuity between the end of the first encoded sequence and the second encoded sequence.

2. An encoding method according to claim 1 wherein the first sequence is known, and the second sequence is unknown.

3. An encoding method according to claim 1 wherein the one of the first and second encoding methods requiring an absolute phase reference is a non-differential type phase encoding method, and wherein the other one of the first and second encoding methods is a differential type phase encoding method.

4. An encoding method according to claim 3 wherein the first sequence is known and the second sequence is unknown.

5. An encoding method according to claim 4 wherein the first encoding method is applied to the first sequence, and the second encoding method is applied to the second sequence.

6. An encoding method according to claim 3 wherein the first encoding method is DPSK with respect to the initial phase, and the encoding of the second sequence comprises encoding N-PSK phases and offsetting each phase by the initial phase.

7. An encoding method according to claim 6 wherein the DPSK is DQPSK and the N-PSK phases are 8-PSK phases.

8. An encoding method according to claim 1 wherein the first sequence is unknown and the second sequence is known.

9. An encoding method according to claim 8 further comprising the steps of:
   encoding a third sequence which is unknown and which follows said second sequence to produce a third encoded sequence using a third encoding method which is the same as said first encoding method and which is such that there is no phase discontinuity between the end of the second encoded sequence and the third encoded sequence.

10. An encoding method according to claim 9 wherein the first encoding method is N-PSK, the second encoding method is DPSK, and the third encoding method is N-PSK.

11. An encoder for executing a method according to claim 1.

12. A TDMA basestation for executing a method according to claim 1.

13. A TDMA basestation for executing a method according to claim 6.

14. A TDMA mobile station for executing a method according to claim 1.

15. A TDMA mobile station for executing a method according to claim 10.

16. An encoding method of encoding a slot having a known sequence and a remainder of the slot comprising the steps of:
    encoding the known sequence using DPSK with respect to an initial phase;
    encoding the remainder of the slot using N-PSK phases shifted by the initial phase.

17. An encoding method according to claim 16 wherein the slot has a structure as defined by the ANSI 136 Rev. A standard.

18. A method of switching from DPSK to N-PSK comprising:
    storing an initial phase used in the DPSK;
    when it is time to switch to the N-PSK, using N-PSK phases offset by the initial phase.

19. A decoder for executing a method for receiving over an air interface a TDMA signal containing a first sequence of DPSK phases encoded with respect to an initial phase and containing known information followed by a second sequence of unknown N-PSK phases each offset by said initial phase, the method comprising:
    using the known DPSK phases to determine one or more channel parameter(s); and
    decoding the unknown N-PSK phases using the channel parameters.

* * * * *